US005790896A

United States Patent [19]

Nguyen

[11] Patent Number: 5,790,896

[45] Date of Patent: Aug. 4, 1998

[54] APPARATUS FOR A TESTING SYSTEM WITH A PLURALITY OF FIRST CONNECTION HAVING A STRUCTURAL CHARACTERISTIC AND A PLURALITY OF SECOND CONNECTION HAVING A DIFFERENT STRUCTURAL CHARACTERISTIC THAN THE FIRST CONNECTION

[75] Inventor: John Thai Nguyen, Middletown, R.I.

[73] Assignee: The United States of America as represented by the Secretary of the Navy, Washington, D.C.

[21] Appl. No.: 682,902

[22] Filed: Jun. 24, 1996

[51] Int. Cl.[6] .......... G06F 13/00

[52] U.S. Cl. .......... 395/892; 395/500; 395/821; 395/882; 395/893; 439/49; 439/169; 439/177; 439/491

[58] Field of Search .......... 395/836, 500, 395/821, 882, 892, 893; 380/3; 439/49, 169, 177, 491

[56] References Cited

U.S. PATENT DOCUMENTS 4,972,470 11/1990 Farago .......... 380/3
5,121,482 6/1992 Patton .......... 395/836

FOREIGN PATENT DOCUMENTS 061698867 6/1994 Japan .
08222332 8/1996 Japan .
08265937 10/1996 Japan .

*Primary Examiner*—Thomas C. Lee
*Assistant Examiner*—Po C. Huang
*Attorney, Agent, or Firm*—Michael J. McGowan; William F. Eipert; Prithvi C. Lall

[57] ABSTRACT

An input/output module in a system for testing the functionality of an electronic system. The input/output module includes a plurality of input connections for receiving signals from the electronic system and a number of output connectors with different structural characteristics adapted for mating with plugs of correspondingly different structural characteristics to direct signals to another component of the testing system. For example the input/output module can include a plurality of BNC type plugs for signals of a first type and TNC type plugs for signals of a second type. This arrangement inhibits unintended cross connections between specific output connectors.

20 Claims, 7 Drawing Sheets

APPARATUS FOR A TESTING SYSTEM WITH A PLURALITY OF FIRST CONNECTION HAVING A STRUCTURAL CHARACTERISTIC AND A PLURALITY OF SECOND CONNECTION HAVING A DIFFERENT STRUCTURAL CHARACTERISTIC THAN THE FIRST CONNECTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to testing systems for selective interconnection with an electronic system and more particularly to an input/output module for facilitating multiple connections between the electronic system and a testing system.

(2) Description of the Prior Art

Various known types of connectors, such as BNC and TNC types, facilitate the attachment of electronic signal cables between a testing system and components under test. Those skilled in the art recognize that the selection of any of these known connector types is generally a matter of design choice and often personal preference. At other times the selection may be driven by mechanical aspects of a particular system.

Various representative connectors of the type to which this invention relates are disclosed in U.S. Pat. No. 3,764,959 to Toma et al., U.S. Pat. No. 5,122,063 to Cooper, and U.S. Pat. No. 5,413,504 to Kloecker et al.

U.S. Pat. No. 3,764,959 to Toma et al. discloses a coaxial connector assembly that can be mounted on cable of differing outer dimensions. The assembly enables attaching generally known connector types, such as TNC, N, BNC, HN, LC, LT, SMA, and UHF types, for a nominal cable size and accommodates slight variations in actual outer dimensions that are typical of cables of different manufacturers.

U.S. Pat. No. 5,122,063 to Cooper discloses an electrical conductor assembly that includes male and female connector components of the TNC type. Spring loaded pins on one component cooperate with recesses on the other to enable relative rotation of the components when they are mated. Cooper further discloses other connector types, such as BNC, DIN, SMA, UHF, Banana plug and RCA types, that incorporate this feature.

U.S. Pat. No. 5,413,504 to Kloecker et al. discloses an improved BNC type connector. Specifically, the shell of the connector is capacitively linked with a chassis in which the connector mounts to reduce noise in electrical signals passing through the connector. Kloecker et al. also discloses that this feature can be used in other known connectors.

Examples of devices incorporating connectors of diverse types are disclosed in U.S. Pat. No. 4,717,358 to Chaundy, U.S. Pat. No. 5,007,860 to Robinson et al. and U.S. Pat. No. 5,233,501 to Allen et al.

U.S. Pat. No. 4,717,358 to Chaundy discloses a cover plate for use in a wire raceway panel for latching the cover plate in the panel. An embodiment of the cover plate includes a BNC coaxial data connector and a six-pin telephone jack.

U.S. Pat. No. 5,007,860 to Robinson et al. discloses a modular communication coupling platform for supporting multiple connections from a single outlet. Each platform has a pair of connector housings. Each connector housing supports a telephone connection jack and a BNC type connector. Robinson et al. also discloses that the BNC type connector of each housing can be replaced with a TNC or F-type coaxial connector or an ST, SMA, or FDD1 type optic cable connector.

U.S. Pat. No. 5,233,501 to Allen et al. discloses a communication network module having circuits connecting a series of front panel input and rear panel output connectors. The rear panel output connectors are either all BNC or TNC type connectors that connect the network module to test or monitoring equipment. Each of the front input connectors receive signals from the electronic devices to be tested and are of the same type as the other front input connectors.

One testing system employed by the United States Navy includes an input/output module and a data recorder. The input/output module includes a multi-prong input connector that receives a plurality of disparate electrical signals from a system under test. Some of these electrical signals have a first voltage characteristic; others of the electrical signals have a second voltage characteristic that is incompatible with the first. This input/output module also includes a plurality of output connections corresponding with the prongs of the input connector. Each output connection comprises a standard BNC type connector cable passing such signals to the data recorder.

In accordance with the foregoing references, it is well known to provide an input/output module that has input and output connectors and that interfaces test equipment of the test system and the electronic system to be tested. In such prior art input/output modules, however, the operator must determine a multichannel input connection or the specific interconnection of each cable to an input or output connection. When disparate and incompatible electrical signals are involved, the selection becomes very important. Connector markings by various colors, alpha-numeric characters or both, while helpful, are not fool proof. It is still possible to make incorrect connections thereby damaging the test equipment and even putting personnel at risk.

SUMMARY OF THE INVENTION

Thus, it is an object of this invention to provide a system of connections having different structural characteristics for conducting voltage signals of different voltage characteristics.

Another object of this invention is to provide a system of connections that facilitates connection of equipment under test with test equipment while inhibiting connection of AC and DC voltage outputs from the equipment under test to DC and AC voltage inputs to the test equipment.

Yet another object of this invention is to provide an input/output module as part of a testing system with physically spaced and physically different sets of connectors for output signals having different voltage characteristics.

Still another object of this invention is to provide an input/output module that promotes the correct electrical connection of output signals having different voltage characteristics to test equipment.

Yet still another object of this invention is to provide testing apparatus for recording interface signals that includes a passive input/output module that readily and simply connects with a data recorder.

It is a further object of this invention to provide a simple input/output module that minimizes the potential of any incorrect connections of output lines from equipment under test with the test equipment.

According to one aspect of this invention apparatus an electrical interface between an electronic system and test instrumentation includes first connections for mating with ones of connecting lines that conduct signals having the first voltage characteristics to the test instrumentation and second connections for mating with others of the connecting lines that conduct signals having the second voltage characteristic. The first connections have different structural characteristics than each of the second connections so that cross connection of the first and second characteristics is prevented.

According to a further embodiment of this invention a testing apparatus includes a recorder to monitor first and second information signals corresponding to interface signals having first and second voltage characteristics passing between a first system and a second system, and an input/output module responsive to the interface signals for transmitting the first and second information signals to the recorder through first and second cables. The first and second cables transmit the first and second information signals with first and second voltage characteristics that correspond to the interface signals. A first end of the first and second cables connect with the recorder and a second end of the first and second cables include a plurality of first and second connectors with first and second structural characteristics, respectively. Output connections of the input/output module have third and fourth structural characteristics that mate with the second ends of the first and second cables, respectively, and that prevent mating with the second ends of the second and first cables, respectively.

BRIEF DESCRIPTION OF THE DRAWINGS

The appended claims are intended to particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
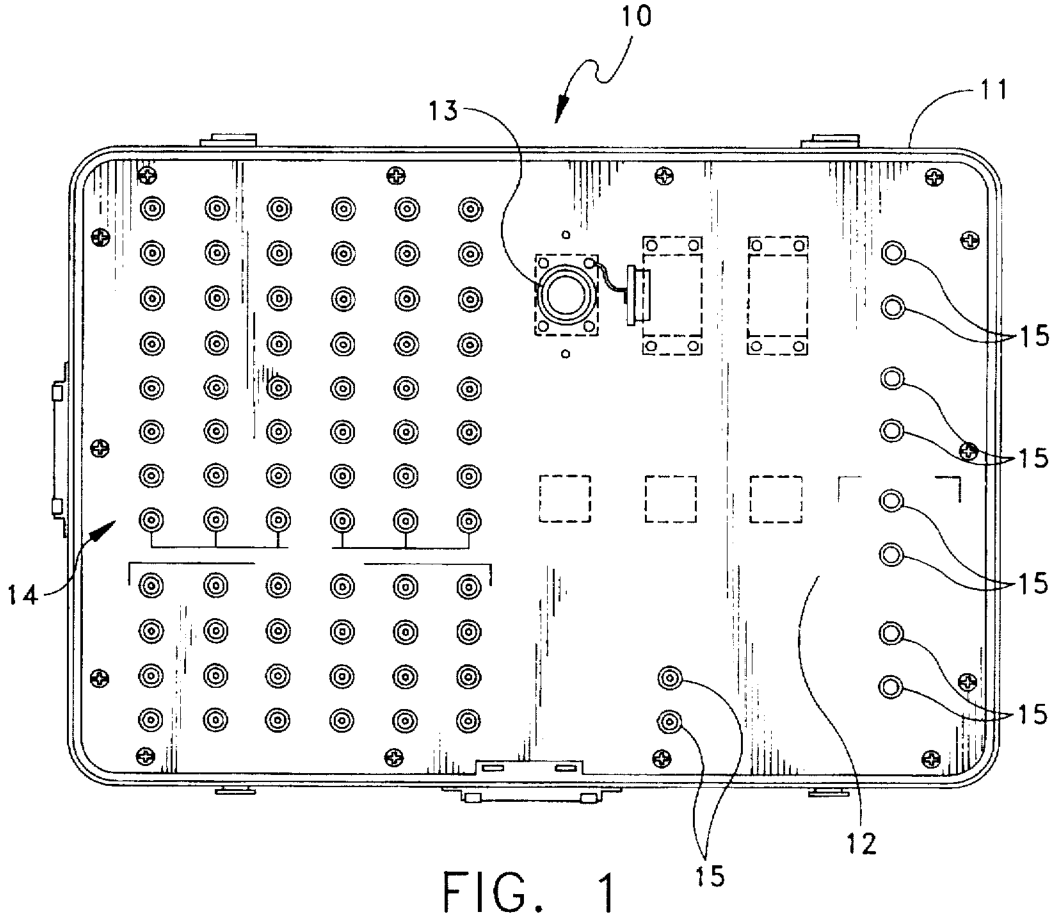
FIG. 1 is a front view of an input/output module according to this intention.

As shown in FIG. 1 an input/output module 10 according to this invention includes a housing 11 with a panel 12 supporting a multichannel input connector 13 that carries signals of first and second voltage characteristics. The panel 12 also carries a set 14 of individual output connectors of a first type and a second set 15 of individual output connectors of a second type. Predetermined output connections of the set 14 connect via paths within the housing 11 to predetermined input connections of the connector 13 that receives signals of the first voltage characteristic. Predetermined connectors of the second set 15 of output connections connect in a similar manner with predetermined connections of the connector 13 that receive signals of the second voltage characteristic. The output connectors of each of the sets 14 and 15, respectively, are structurally different so that mating connections generally suited for mating with the connectors in the set 14 do not mate with the connectors in the set 15.

Figure 2A:
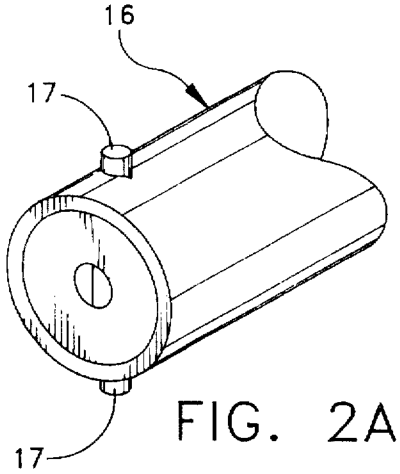
FIGS. 2A and 2B are perspective views of connectors useful in the embodiment of FIG. 1.
Figure 2B:
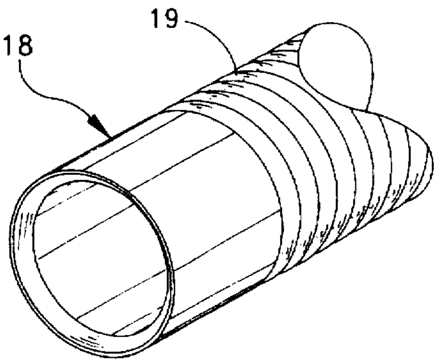

By way of example, FIGS. 2A and 2B depict types of individual connectors useful in providing ones of the sets 14 and 15, respectively. The connector 16 of FIG. 2A includes the characteristic extending portions 17 of a BNC type female plug connector and the connector 18 of FIG. 2B includes the characteristic threads 19 of a TNC type plug female connector. Those skilled in the art will appreciate that male BNC connectors, while suited for mating with the BNC connector 16, generally are inhibited from mating with the TNC connector 17. Likewise, male TNC connectors are particularly suited for mating with the connector 17, but are inhibited from mating with the connector 16.

Figure 3:
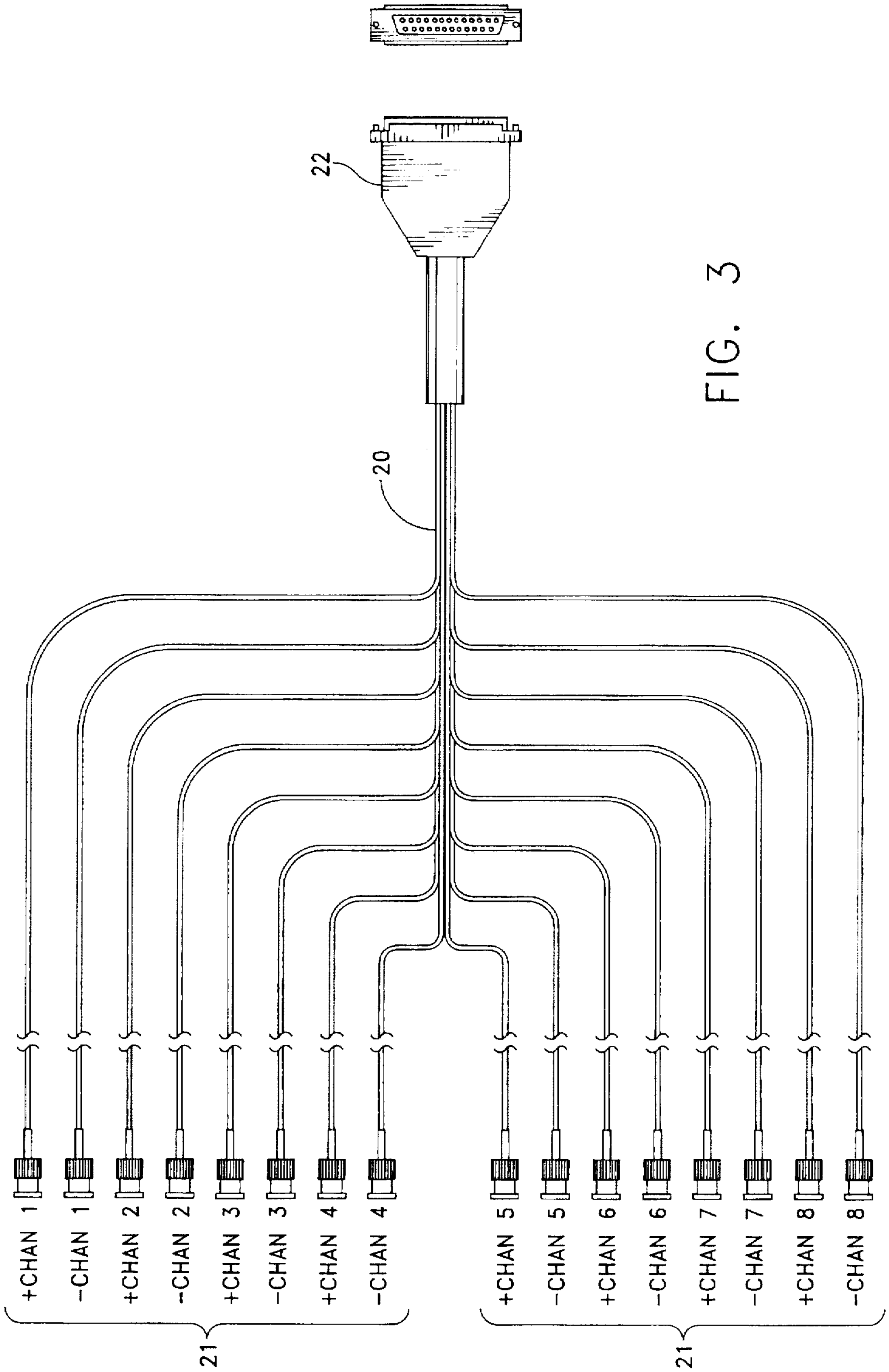
FIGS. 3 through 5 are elevational views of cables useful in connecting the input/output module of FIG. 1 with electronic systems and test equipment of FIG. 1.
Figure 4:
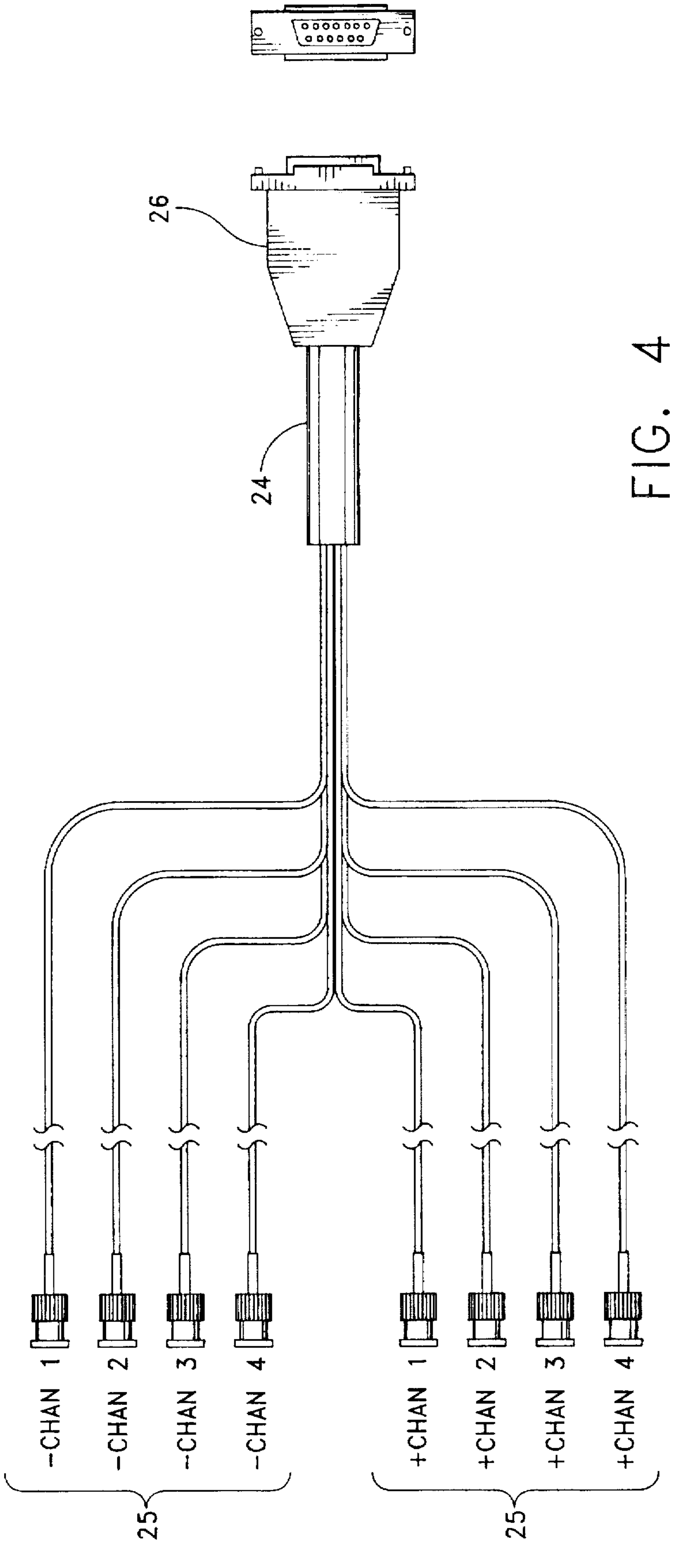
Figure 5:
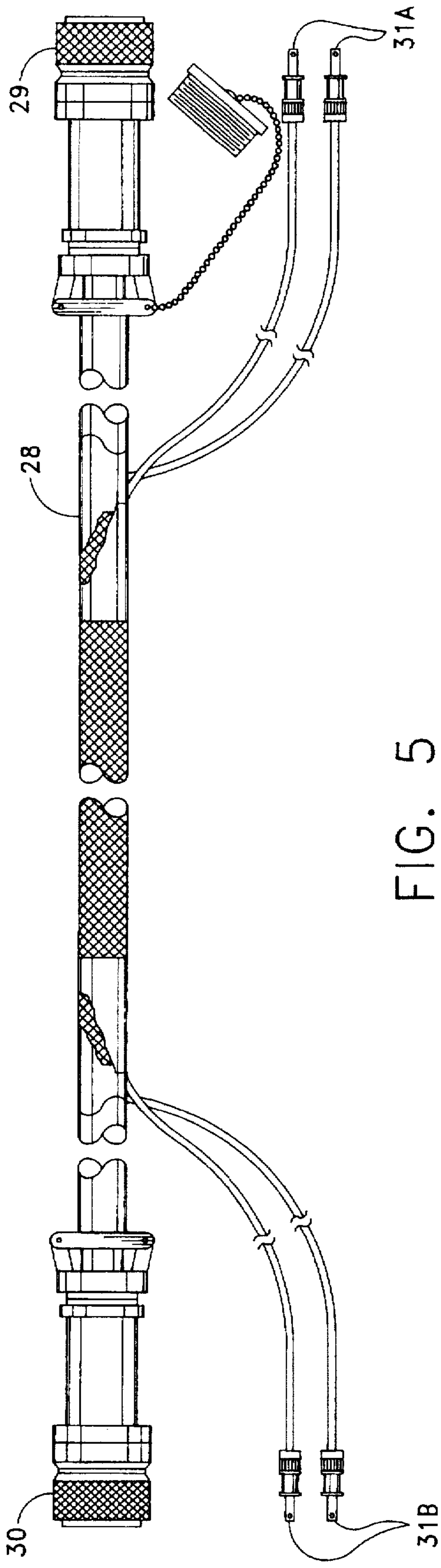

FIGS. 3 through 5 depict various cables useful with the input/output module 10 of FIG. 1. A multichannel cable 20 in FIG. 3 terminates at one end with a plurality of BNC type male connectors 21 for mating with ones of the BNC type female connectors 16 of FIG. 2A and terminates at the other end at a multichannel D-type connector 22. A multichannel cable 24 depicted in FIG. 4 includes at one end a plurality of TNC type male connectors 25 suited for mating with TNC type female connectors 17 and a multichannel D-type connector 26 at the other end. Preferably the connectors 22 and 26 of the cables 20 and 24 of FIGS. 3 and 4 also are of different types or of different sizes to assure correct connections between equipment such as a data recorder 27 (FIG. 6) receiving the output signals and the sets 14 and 15. FIG. 3 depicts a DB-25 connector; FIG. 4, a DB-15 connector.

In FIG. 5, a multi-line cable 28 suited for carrying the input electrical signals to the input/output module 10 of FIG. 1 includes a male connector 29 that mates with the input connector 13 to provide the plurality of input signals. The cable 28 also includes a plurality of connections comprising a single multichannel male connector 30 for receiving the electrical signals from an electrical system under test. The cable 28 also includes input connections 31A and output connections 31B as explained hereinafter.

Figure 6:
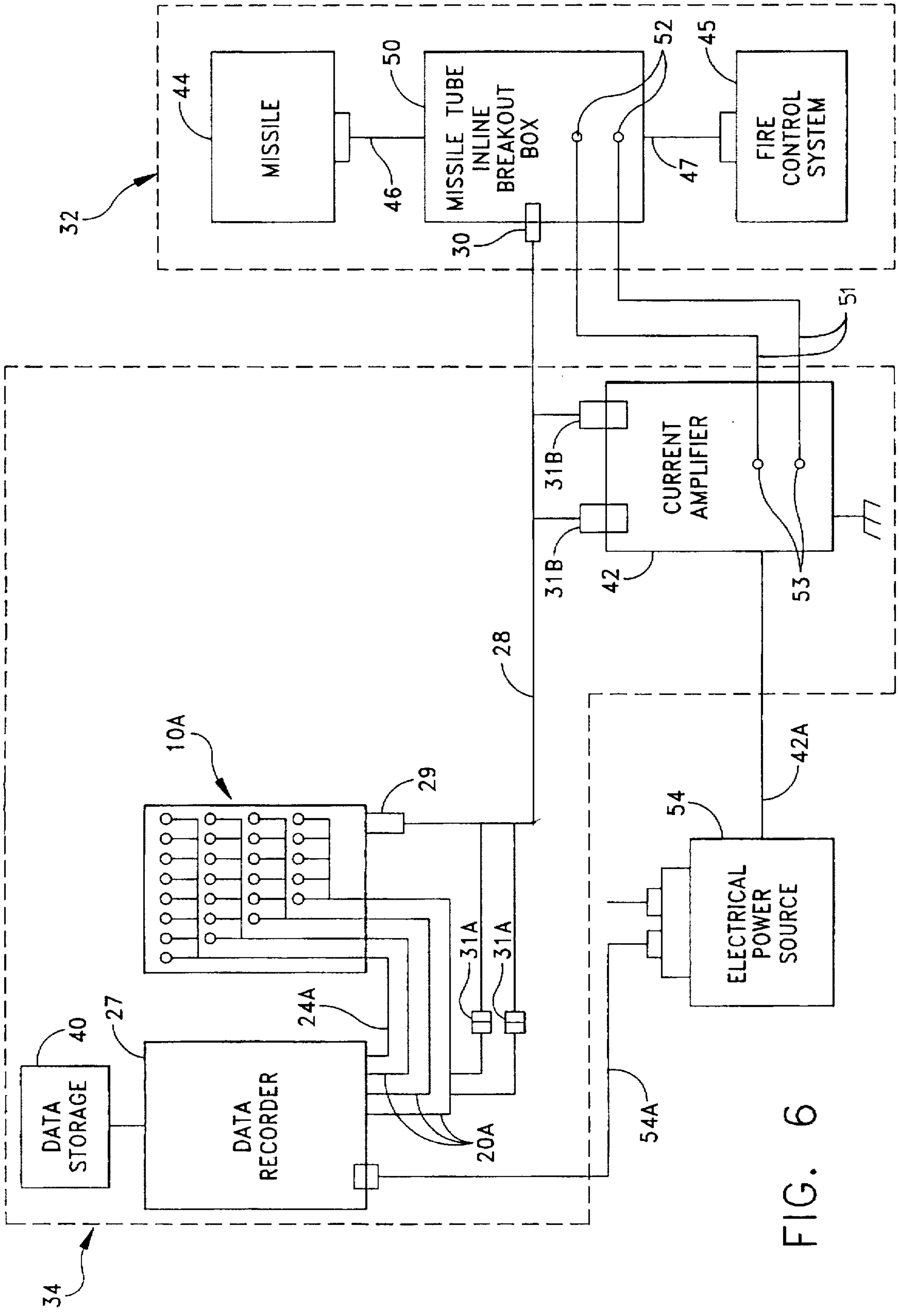
FIG 6. is a schematic of a first testing system according to this invention connected with first and second electronic systems, respectively.
Figure 7:
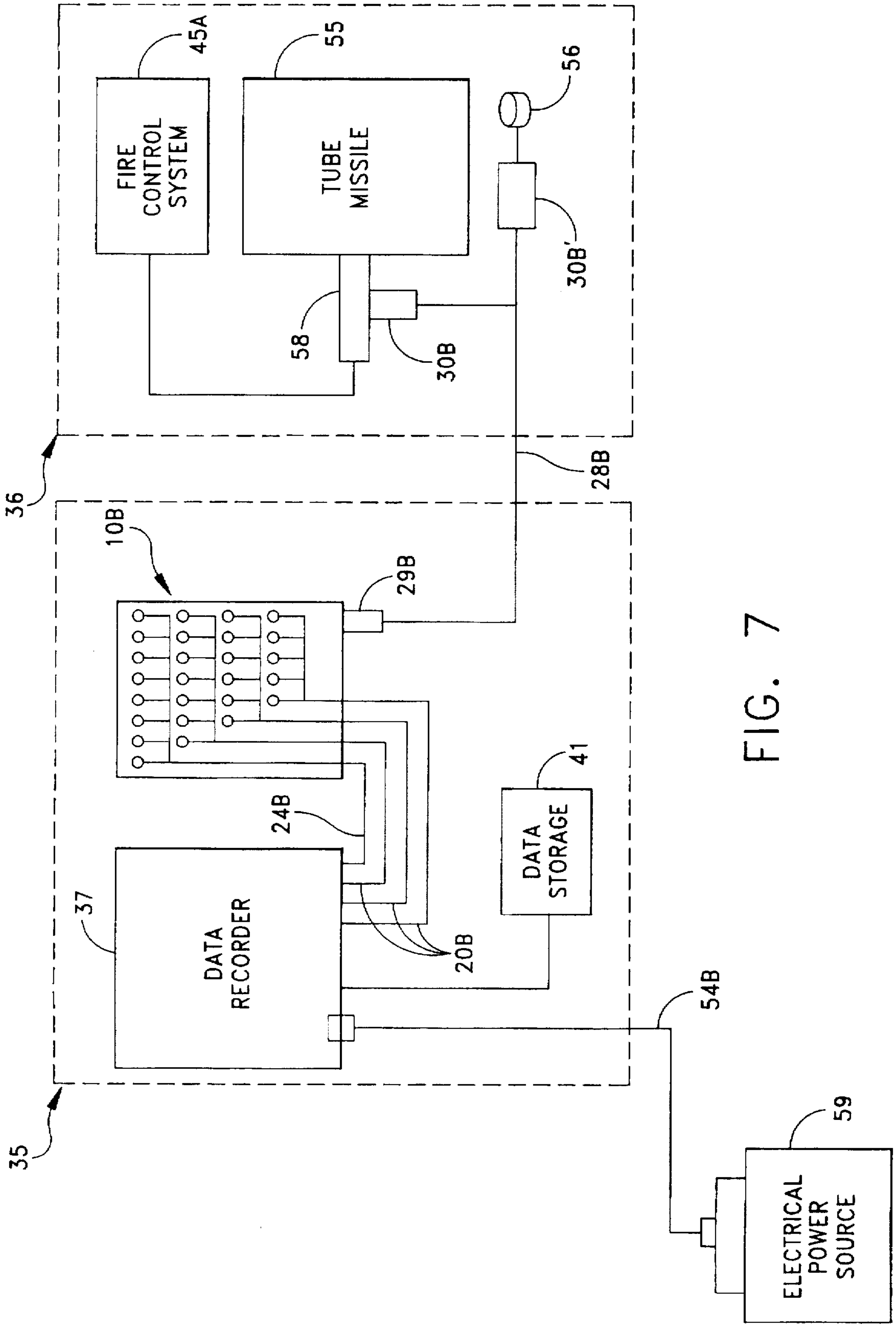
FIG. 7 is a schematic of a second testing system according to this invention connected with first and second electronic systems, respectively.

FIGS. 6 and 7 depict testing systems 34 and 35 each of which includes an input/output module 10A and a second input/output module 10B, respectively, that are substantially identical to the input/output module 10 of FIG. 1. The testing systems 34 and 35 of FIGS. 6 and 7 are useful for testing electronic systems associated with missile launching systems 32 and 36. Each of the testing systems 34 and 35 also includes the data recorder 27 in FIG. 6 and another data recorder 37 in FIG. 7 and data storage units 40 and 41 in FIGS. 6 and 7, respectively. Each of the data recorders 27 and 37 monitors signals received from the input/output modules 10A and 10B, respectively, to enable users to determine the nature of the signals received. Additionally, the data recorders 27 and 37 suitably connect with the data storage units 40 and 41, respectively, to enable storage for later analysis of the monitored signals.

Referring to FIG. 6 the testing system 34 further includes a current amplifier 42 for amplifying certain signals passing from the missile launching system 32 to the data recorder 27.

These signals by-pass the input/output module 10A to avoid the necessity of making the input/output module 10A an active system as did prior art input/output modules described above. The testing system 34 connects with the missile launching system 32, which in this case comprises a missile 44 and a fire control system 45 connecting through umbilical cables 46 and 47 in series. A break-out box 50 intermediate the cables 46 and 47 provides a suitable connection for the cable 28. The connectors 29 and 30 of the cable 28 connect with the input/output module 10A and the break-out box 50 respectively to connect the input/output module 10A with the missile launching system 32. Signals at connectors 52 of the break-out box 50 pass along lines 51 to connectors 53 of the current amplifier 42 to provide an amplified current signal passing through cable 28 and the connectors 31B.

Connectors on cables 20A and 24A that correspond to cables 20 and 24 in FIGS. 3 and 4, connect at one end with respective ones of the output connector sets 14 and 15 (see FIG. 1) and with the connectors 31A of the cable 28 to provide inputs to the data recorder 27. The data recorder 27 enables a user to monitor the received signals and record the signal data in the data storage unit 40 for later retrieval. An electrical power source 54 provides power to the data recorder 27 through a connection line 54A and to the current amplifier 42 through a line 42A.

The testing system 35 of FIG. 7 receives signals from the missile launch system 36 that includes a missile 55, a fire control system 45A and a firing solenoid pickup coil 56. A connector 30B of a cable 28B connects to a break-out box 58 electrically intermediate the fire control systems and the missile 55. The cable 28B also includes a second connector 30B' that connects to the firing solenoid pick up coil 56. The signals from the break-out box 58 and the firing solenoid coil 56 are connected to the data recorder by plug 29B that corresponds with the input connector 13. Cables 20B and 24B connect ones of the connectors of the sets 14 and 15 (see FIG. 1) of the input/output module 10B with the data recorder 37. The data recorder 37 and a data storage unit 41 function substantially similarly to the data recorder 27 and the data storage unit 40. An electrical power source 59 energizes the data recorder 37 along a power line 54B.

Figure 8:
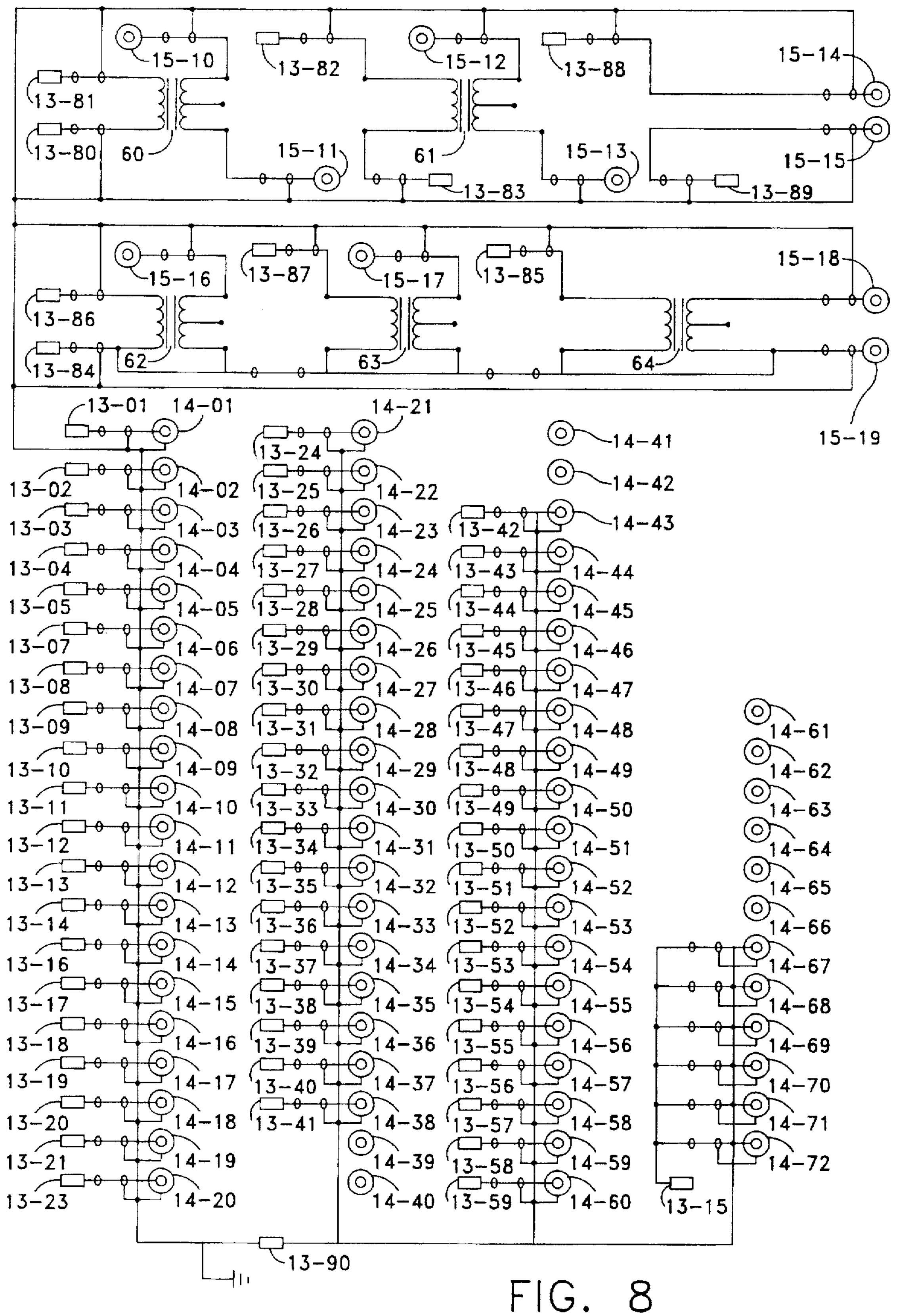
FIG. 8 is a circuit diagram of circuitry useful in the embodiment of FIG. 1.

A circuit diagram useful in the embodiment of FIG. 1 of this invention as depicted in FIG. 8 includes a plurality of input channels 13-1, 13-2, . . . , 13-59, 13-80 through 13-89 and 13-90 that correspond with the input channels of the input plug 13. The input channels 13-1, 13-2, . . . , 13-59 connect voltage signals of the first voltage characteristic through the depicted circuitry with ones of the set 14 (of FIG. 1) output connectors, 14-1 through 14-38, 14-43 through 14-60, and 14-67 through 14-72. Output connectors 14-39 through 14-42 and 14-61 through 14-66 constitute spare connectors not connected with any input channels in this case. The input channels 13-80 through 13-89 connect with ones of the set 15 of output connectors 15-10 through 15-19. The input channel 13-90 functions a grounding channel for the circuitry of FIG. 8.

In the testing systems 34 and 35 of FIGS. 6 and 7 the input signals to the input/output modules 10A and 10B have signals of a first voltage characteristic that pass from ones of the input channels 13-1 through 13-59 to ones of the connections of the set 14 and signals of a second voltage characteristic that pass from the input channels 13-80 through 13-89 to ones of the connections of the set 15. The first voltage characteristic signals are direct current (DC) signals with a nominal voltage level of 30 VDC or less. The second type of signals are three-phase, 60 Hz or 400 Hz, 115 VAC signals; specifically, channels 13-80 through 13-83, 13-88 and 13-89 carry the 60 Hz signal while channels 13-84 through 13-87 carry the 400 Hz signal. The voltage level of the input alternating current signals between the input channels 13-80 and 13-81 and 13-82 and 13-83 connect with the output connectors 15-10 and 15-11 and the output connectors 15-12 and 15-13, respectively, through transformers 60 and 61. The transformers 60 and 61 reduce the voltage of the AC signals at the output connectors. Likewise the input channels 13-84 through 13-87 connect with output connectors 15-16 through 15-19 via transformers 62, 63 and 64 also to reduce the output voltage. Thus, the voltage level at most of the connections of the set 15 can be held to a predetermined range such as around approximately 30 VAC.

Those skilled in the art will now recognize that connecting the cables 20 of FIG. 3 intended to connect with one of the sets 14 with those of the set 15 could damage the monitoring circuitry of the data recorders 27 and 37 and could subject users and installers of the testing systems to a risk of electrical shock. The use of connectors that inhibit unintended and improper cross connections such as between the connectors 16 and 18 of FIGS. 2A and 2B reduce the possibility of such improper or cross connections. That is, by physically structuring the connections of the sets 14 and 15 differently, it is possible to promote correct connections of preselected mating combinations and thus provide greater safety for personnel and equipment. Indicia such as colors and/or alpha numeric symbols may also be used as in the prior art to assist the installer and persons checking the appropriateness of the connections, but the physical connections prevent the inadvertent cross connections of signals with different voltage characteristics.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. Apparatus with a plurality of input and output electrical connectors for electrically interfacing through input and output connection lines between test instrumentation and an electronic system under test that operates with a plurality of electrical signals having first and second voltage characteristics, said apparatus comprising:

connector means for electrically connecting with ones of the input connection lines for receiving from the electronic system the discrete electrical signals of the first and second voltage characteristic;

a plurality of first connection means each having a first structural characteristic for mating with ones of the output connecting lines to conduct signals corresponding to the signals having the first voltage characteristic to the test instrumentation; and a plurality of second connection means each having a second structural characteristic that is incompatible with the first structural characteristic for mating with others of the output connecting lines to conduct second electrical signals corresponding to the discrete electrical signals having the second voltage characteristic, whereby cross connections of signals of the first and second voltage characteristics is prevented.

2. Apparatus as recited in claim 1 wherein each of the connecting lines that conduct the first electrical signals has a BNC plug formed at one end and wherein each of said first connection means comprises a mating BNC connector for receiving the BNC plug.

3. Apparatus as recited in claim 1 wherein each of the connecting lines that conduct the second electrical signal has a TNC plug formed at one end and wherein each of said second connection means comprises a mating TNC connector for receiving the TNC plug.

4. Apparatus as recited in claim 3 wherein each of the connecting lines that conduct the first electrical signals has a BNC plug formed at one end and each of said first connection means comprise a mating BNC connector for receiving the BNC plug.

5. Apparatus as recited in claim 4 further comprising a housing with an exposed panel, said panel supporting said first and second connection means.

6. Apparatus as recited in claim 5 further comprising transformer means carried by said housing for reducing the voltage of a selected one of the electrical signals received through said connector means.

7. Apparatus as recited in claim 6 wherein the test instrumentation is adapted to monitor the state of the electrical signals in said system and wherein said connector means includes a multiwire cable that connects the system with said apparatus.

8. Apparatus as recited in claim 1 further comprising a housing with an exposed panel, said panel supporting said first and second connection means.

9. Apparatus as recited in claim 8 further comprising transformer means carried by said housing for reducing the voltage of a selected one of the discrete electrical signals received through said connector means.

10. Apparatus as recited in claim 9 wherein the test instrumentation is adapted to monitor the state of the discrete electrical signals in said system and wherein said connector means includes a multiwire cable that connects the weapons system with said apparatus.

11. Testing apparatus for monitoring a plurality of discrete interface signals passing between a first system and a second system, certain of the interface signals having a first voltage characteristic and others of the interface signals having a second voltage characteristic, said testing apparatus comprising:

input/output means for transmitting first and second electrical output signals having voltage characteristics corresponding to the voltage characteristic of the first and second interface signals, said input/output means including first and second mating means having first and second diverse structural characteristics for energization by the signals having the first and second voltage characteristics, respectively;

recording means for monitoring the first and second electrical output signals;

a plurality of first cable means for connecting said input/output means with said recording means to transmit the first electrical output signals, said first cable means having first electrical connector means with a third structural characteristic for mating with said first mating means; and second cable means for transmitting the second electrical output signals from said input/output means to said recording means, said second cable means including a second electrical connector means having a fourth structural characteristic for mating with said second mating means such that mating said first electrical connector means and said second electrical connector means with said second mating means and said first mating means, respectively, is inhibited.

12. Testing apparatus as recited in claim 11 therein said first mating means is formed as a plurality of BNC type mating connectors and said first electrical connector means is a plurality of BNC type plugs.

13. Testing apparatus as recited in claim 11 wherein said first mating means is a plurality of TNC type mating connectors and said first electrical connector means is a plurality of TNC type plugs.

14. Testing apparatus as recited in claim 13 wherein the said second mating means is formed as a plurality of BNC type mating connectors with said second electrical connector means is a plurality of BNC type plugs.

15. Testing apparatus as recited in claim 14 wherein said input/output means further includes a housing with an exposed panel, said panel supporting said first and second mating means to facilitate mating of said first and second mating means with said first and second connector means, respectively.

16. Testing apparatus as recited in claim 15 wherein said input/output means further includes transformer means for reducing the voltage of ones of the interface signals received by said input/output means.

17. Testing apparatus as recited in claim 13 wherein said recording means includes means for storing the state of signals received by said recording means.

18. Testing apparatus as recited in claim 11 wherein said input/output means further includes a housing with an exposed panel that supports said panel supporting said first and second output means.

19. Testing apparatus as recited in claim 18 wherein said input/output means further includes transformer means for reducing the voltage of received signals.

20. Testing apparatus as recited in claim 11 wherein said recording means further includes storage means for storing the state of signals received by said recording means.

* * * * *